April 15, 1930.  R. W. ANDREWS  1,754,479
FLUID SEPARATOR
Filed Dec. 5, 1925  2 Sheets-Sheet 1

INVENTOR:
Roger W. Andrews
BY
ATTORNEY.

April 15, 1930.   R. W. ANDREWS   1,754,479
FLUID SEPARATOR
Filed Dec. 5, 1925    2 Sheets-Sheet 2
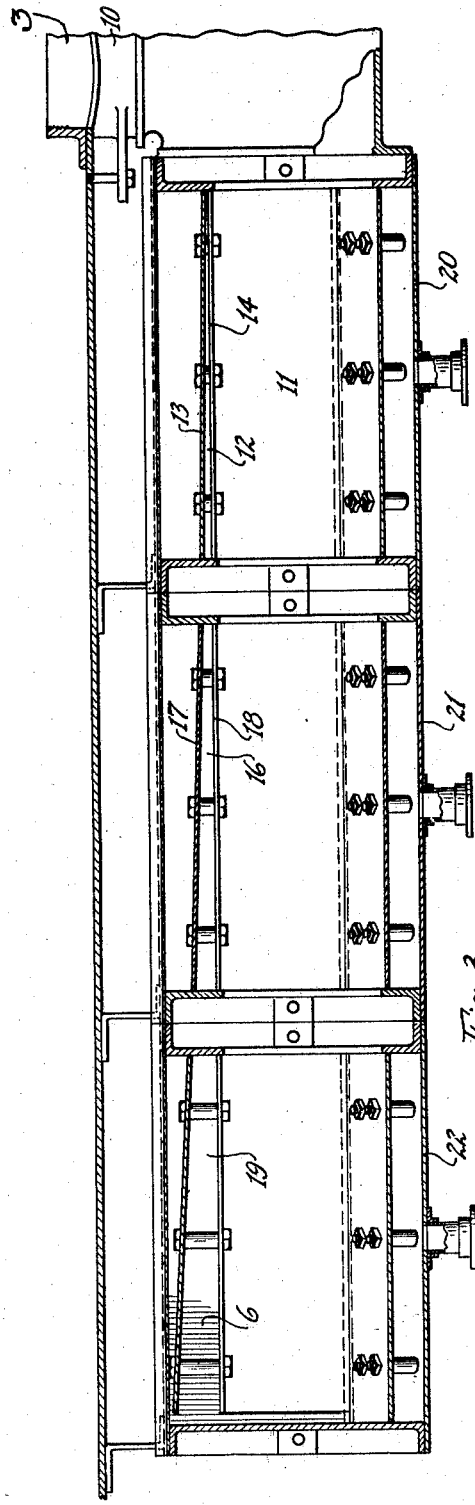
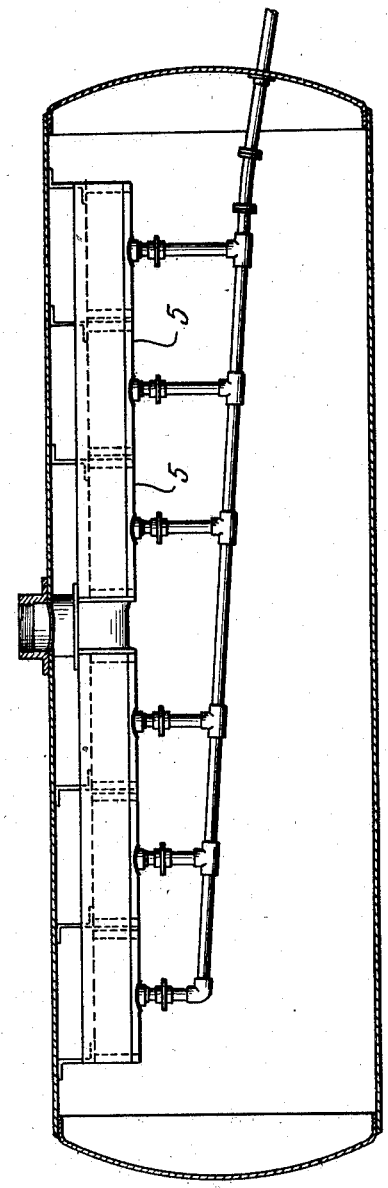
INVENTOR:
Roger W. Andrews
BY
ATTORNEY.

Patented Apr. 15, 1930

1,754,479

UNITED STATES PATENT OFFICE

ROGER W. ANDREWS, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed December 5, 1925. Serial No. 73,317.

This invention relates to improvements in fluid separators, and has for its object the production of means for more perfectly separating the liquids and other impurities from various gases. The invention is directed towards eliminating all of the impurities from the gas, such as oil or water vapor, by maintaining the speed of the gas sufficiently low as it passes through the purifying means of the separator. A further object is to properly distribute the gas so that it will pass through all portions of the purifying means as nearly as possible at the same speed, and thus to increase the capacity of the separator.

Figure 1:
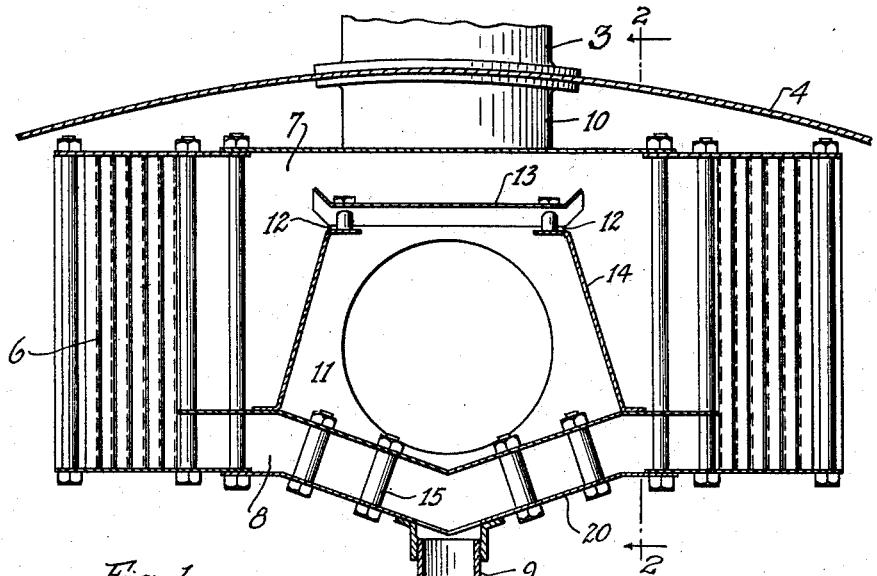
Figure 2:
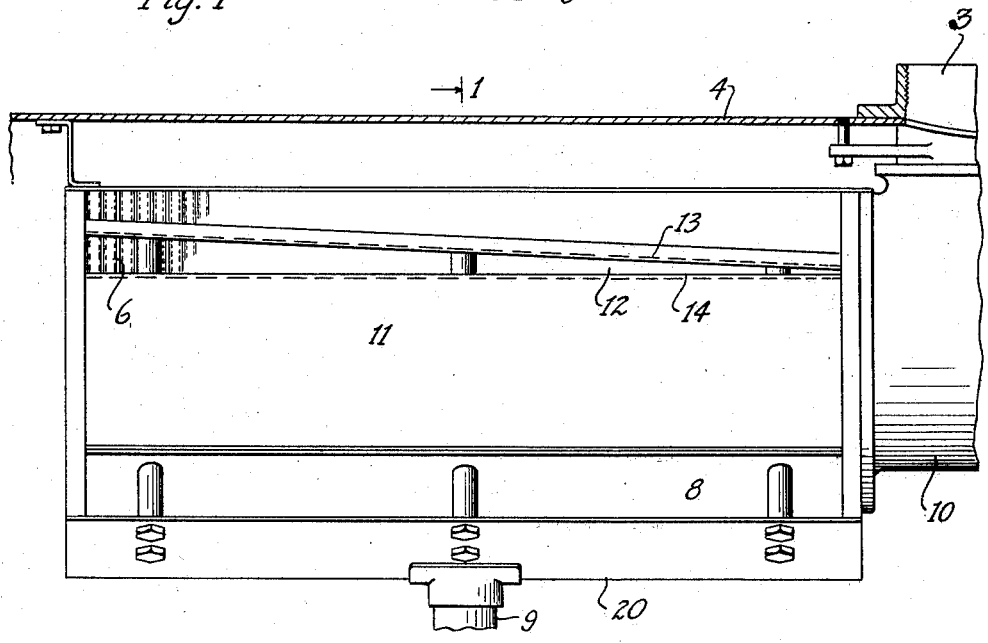

Of the accompanying drawings, Fig. 1 is a transverse section of a steam separator along the line 1—1 of Fig. 2 which embodies the features of my invention; Fig. 2 is a longitudinal section along the line 2—2 of Fig. 1, Fig. 3 is a reduced longitudinal section of several sections assembled; and Fig. 4 is a further reduced elevation of an entire separator mounted in a boiler.

Although I have herein illustrated and described a steam separator, or purifier, as embodying my invention, yet it is to be understood that the invention is applicable to the separation or purification of any fluids, particularly vapors or gases, and the term separator or purifier as used herein is intended to refer to any suitable form of separator, or purifier, wherein impurities such as liquid or solid particles are separated from the gas or vapors which it is desired to purify.

As is well understood, in order to separate impurities such as moisture and solid particles from the steam, it is common to pass the steam, on its way from the interior of the boiler to the steam pipes of the boiler system, through a purifier or separator. The purifier ordinarily comprises some form of baffles through which the steam must pass, and the baffles are so arranged that while the steam itself will pass around them, yet the impurities, such as moisture, will be retained and pass back into the boiler or drained outside of the boiler, as conditions may warrant. It is towards such a purifier that my invention is directed and the apparatus which I prefer herein to illustrate my invention comprises a separator casing having six sections, 5 in the sides of which are mounted banks of baffles 6, Fig. 3. The separator when in use is ordinarily mounted within a boiler 4, and the steam passes through the baffles 6 into the interior chamber 7 of the purifier; and then, ordinarily, the steam passes through an outlet 10 out of the boiler into the steam main 3 of the system. As the steam passes through the baffles the moisture therein is stopped in its flow by the baffles and it runs downwardly into the passageway 8 and thence through a pipe 9 communicating with this passageway to any point to which it is desired to discharge the liquid; and the liquid carries with it other impurities such as solid particles which were contained in the steam.

I have found, however, that if the speed of the steam through the baffles is too great the separation of the moisture from the steam will be imperfect, as there is more or less of a tendency of the moisture, owing to spattering or otherwise, to rebound from the baffle surfaces and to be carried along with the steam. While the exact speed with which the steam passes through the baffles is not very material, yet I have found that the speed of the steam through some portions of ordinary separators is sometimes too great. With longitudinal separators having an outlet at one end, the steam entering adjacent the outlet end passes through the baffles frequently at too high a speed, and, at the same time, the steam entering at remote points may pass through the baffles at unnecessarily low speeds.

Therefore, in order to properly distribute the steam so as to cause it to pass through the baffles at all portions of the separator at substantially uniform speeds which are sufficiently low, I provide means for obstructing the flow more and more as the outlet is approached, and I thus increase the resistance to the flow as the outlet is approached at such a rate as to reduce the speed near the outlet without reducing the speed at more remote points materially below the speed near the outlet. Any suitable means may be used for producing such a resistance to the flow of the steam. In this instance I prefer to provide means within the chamber 7 so arranged that the resistance to the flow from this chamber to the outlet increases at such a rate as the outlet is approached as to cause the steam to flow at substantially uniform rates through the baffles throughout the entire length of the separator.

For this purpose I provide in this instance a passageway 11 running longitudinally within the chamber 7 and communicating with the chamber 7 by openings or inlets 12, the cross section of which decreases gradually as the outlet is approached. In this instance I provide such openings by raising the top plate 13 of the central passageway 11 a material distance above the side walls 14 of the passageway. This may be done in any suitable manner, such as by means of bolts 15. And I raise the rear end of the top plate 13 materially higher than the front or outlet end so as to provide a tapering passageway or opening 12 between the central chamber 7 and the passageway 11 through which the steam must pass on its way from the baffles to the outlet 10. In this way the flow of steam through the baffles may be controlled so that the speed through the baffles will be substantially uniform throughout the full length of the separator.

However, I have found it desirable to increase the width of the inlets 12 at a greater rate remote from the outlet than adjacent the outlet, and this I prefer to accomplish by increasing the inclination of the upper edge of the opening with reference to the lower edge step by step, as indicated in Fig. 3. In this figure the entire separator shown comprises three sections, 20, 21 and 22. The opening 12 in the section 20 has the plate 13 raised but slightly above the wall 14, but with the rear end higher than the outlet end. In section 21, the slot opening 16 is not only wider, but the inclination of the plate 17 with reference to the upper edge of the wall 18 is materially greater than in case of the section 20; and this increase in width and inclination is still greater in case of the section 22, so that the slot 19 is materially wider than either of the others and the rate of increase in width per unit of length as the rear end is approached is materially greater. In this manner, by properly proportioning the various parts and the inclination of the upper plates of the passageway 11, the flow of the steam through all portions of the inlet slots to the passageway 11 will be at substantially the same rate and this in turn will cause substantially uniform rate of flow throughout the entire length of the baffles of the separator.

I claim as my invention:

1. A fluid separator comprising a passageway having an inlet and having an outlet adjacent one end, said inlet comprising a plurality of sections, the width of each section of said inlet varying as the change in distance from the end of the inlet of that section varies, but the rate of change per unit of length of such variations in one section being unlike the rate of change in the other sections.

2. A gas separator comprising an elongated casing having a gas outlet adjacent one end, and gas purifying means mounted along one side of said casing, a gas inlet extending along said casing between said outlet and said purifying means, said inlet comprising a plurality of sections, the width of the inlet of each section increasing with the distance from the outlet, and the width of the inlet in one section increasing at a greater rate per unit of length than the width in another section.

3. A gas purifier comprising a casing having an outlet, gas purifying means mounted in said casing, and gas retarding means mounted in said casing between said purifying means and said outlet, said retarding means comprising plates certain of which provide a plurality of gas openings in series, some of which are spaced farther from the outlet than others, the aggregate cross section of each of said openings for any unit of length of said retarding means increasing as said outlet is receded from, and the rate of increase in said cross section being greater with the openings more remote from said outlet.

In testimony whereof, I hereunto set my hand.

ROGER W. ANDREWS.